United States Patent
Wei et al.

(10) Patent No.: US 12,309,467 B2
(45) Date of Patent: *May 20, 2025

(54) VIDEO SPLITTING METHOD AND ELECTRONIC DEVICE

(71) Applicant: Petal Cloud Technology Co., Ltd., Dongguan (CN)

(72) Inventors: Wenbo Wei, Wuhan (CN); Zhigang Guo, Dongguan (CN); Youjun Wang, Dongguan (CN)

(73) Assignee: Petal Cloud Technology Co., Ltd., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/392,076

(22) Filed: Dec. 21, 2023

(65) Prior Publication Data

US 2024/0129600 A1     Apr. 18, 2024

Related U.S. Application Data

(63) Continuation of application No. 17/413,042, filed as application No. PCT/CN2019/121447 on Nov. 28, 2019, now Pat. No. 11,902,636.

(30) Foreign Application Priority Data

Dec. 12, 2018   (CN) .................. 201811519816.X

(51) Int. Cl.
*H04N 7/10* (2006.01)
*H04N 7/025* (2006.01)
(Continued)

(52) U.S. Cl.
CPC ..... *H04N 21/8456* (2013.01); *H04N 21/44016* (2013.01); *H04N 21/4884* (2013.01)

(58) Field of Classification Search
CPC ........... H04N 21/4884; H04N 21/8456; H04N 21/23418; H04N 21/435; H04N 21/44008; H04N 21/44016
See application file for complete search history.

(56) References Cited

U.S. PATENT DOCUMENTS

| | | |
|---|---|---|
| 10,062,414 B1 | 8/2018 | Westphal |
| 2004/0263529 A1 | 12/2004 | Okada et al. |

(Continued)

FOREIGN PATENT DOCUMENTS

| | | |
|---|---|---|
| CN | 101241553 A | 8/2008 |
| CN | 101616264 A | 12/2009 |

(Continued)

OTHER PUBLICATIONS

English translation version of reference CN 101650958 B (Year: 2012).*

*Primary Examiner* — Gigi L Dubasky
(74) *Attorney, Agent, or Firm* — Rimon PC

(57) ABSTRACT

This application provides a video splitting method and an electronic device. When the method is performed by a server, the server processes a long video into a plurality of short videos, and then a terminal obtains the short video from the server and plays the short video; or when the method is performed by a terminal, the terminal obtains a long video from a server, and then the long video is processed into a plurality of short videos, and the plurality of short videos are played.

20 Claims, 9 Drawing Sheets

(51) Int. Cl.
  *H04N 21/44*     (2011.01)
  *H04N 21/488*    (2011.01)
  *H04N 21/845*    (2011.01)

(56) References Cited

U.S. PATENT DOCUMENTS

| | | |
|---|---|---|
| 2007/0253678 A1 | 11/2007 | Sarukkai |
| 2009/0310932 A1 | 12/2009 | Hsieh et al. |
| 2011/0246937 A1 | 10/2011 | Roberts et al. |
| 2015/0296228 A1 | 10/2015 | Chen et al. |
| 2015/0365736 A1 | 12/2015 | Xiong et al. |
| 2017/0228601 A1 | 8/2017 | Kim et al. |
| 2018/0213289 A1 | 7/2018 | Lee et al. |
| 2019/0034528 A1* | 1/2019 | Lintz ............... G06F 16/73 |
| 2020/0374596 A1* | 11/2020 | Zeiler ............... G06F 16/73 |

FOREIGN PATENT DOCUMENTS

| | | | |
|---|---|---|---|
| CN | 101692269 A | | 4/2010 |
| CN | 101719144 A | | 6/2010 |
| CN | 101887439 A | | 11/2010 |
| CN | 101650958 B | * | 5/2012 |
| CN | 102833638 A | | 12/2012 |
| CN | 103856689 A | | 6/2014 |
| CN | 104902279 A | | 9/2015 |
| CN | 104915433 A | | 9/2015 |
| CN | 105007524 A | | 10/2015 |
| CN | 105677735 A | | 6/2016 |
| CN | 105744356 A | | 7/2016 |
| CN | 105847966 A | | 8/2016 |
| CN | 105872710 A | | 8/2016 |
| CN | 105979267 A | | 9/2016 |
| CN | 106231399 A | | 12/2016 |
| CN | 107027060 A | | 8/2017 |
| CN | 107623860 A | | 1/2018 |
| CN | 107704525 A | | 2/2018 |
| CN | 108024143 A | | 5/2018 |
| CN | 108093314 A | | 5/2018 |
| CN | 108449651 A | | 8/2018 |
| CN | 108694217 A | | 10/2018 |
| JP | 2009141810 A | | 6/2009 |
| JP | 2011520162 A | | 7/2011 |

* cited by examiner

VIDEO SPLITTING METHOD AND ELECTRONIC DEVICE

CROSS-REFERENCE TO RELATED APPLICATIONS

This application is a continuation of U.S. patent application Ser. No. 17/413,042, filed on Jun. 11, 2021, which is a national stage of International Application No. PCT/CN2019/121447, filed on Nov. 28, 2019. The International Application claims priority to Chinese Patent Application No. 201811519816.X, filed on Dec. 12, 2018. All of the afore-mentioned patent applications are hereby incorporated by reference in their entireties.

TECHNICAL FIELD

This application relates to the field of terminal technologies, and in particular, to a video splitting method and an electronic device.

BACKGROUND

Currently, learning English by watching English original videos is an extensive learning method. However, currently, English original movies or English original teleplays are relatively long, and short video resources are very scarce. Currently, a long video usually is split into short videos, and the short videos generated in such manner can be used by a user for targeted English learning. In the prior art, a long video usually is automatically split into a plurality of short videos by using a subtitle file. However, a short video generated in such manner has a problem that a dialog starts or ends abruptly, and user experience is poor. Although a long video can be manually split to generate short videos that are more suitable for English learning, labor costs are high.

SUMMARY

This application provides a video splitting method and an electronic device, to split a long video into a plurality of independent short videos. In addition, a dialog in a short video generated in such manner starts or ends relatively smoothly rather than abruptly, thereby improving user experience.

According to a first aspect, an embodiment of this application provides a video splitting method, where the method is applicable to an electronic device, and the method includes: The electronic device determines a video start time point and a video end time point of each scene from a long video. Then, the electronic device determines a subtitle start time point and a subtitle end time point of each subtitle segment from a subtitle file corresponding to the long video. For any scene, the electronic device determines, based on a video start time point and a video end time point of the scene, at least one subtitle segment corresponding to the scene. Then, the electronic device adjusts the video start time point and the video end time point of the scene based on a subtitle start time point and a subtitle end time point of the at least one subtitle segment, to obtain an adjusted video start time point and an adjusted video end time point of the scene. Finally, the electronic device splits the long video based on the adjusted video start time point and the adjusted video end time point of each scene, to generate a plurality of short videos.

In this embodiment of this application, the electronic device can split the long video more smoothly, and a short video generated in such manner starts by gradually transitioning from a scene to a dialog, and ends as the scene ends. This is more user-friendly, and user experience is better.

In a possible design, the electronic device may determine, from the at least one subtitle segment, a subtitle start time point closest to the video start time point of the scene; determine, from the at least one subtitle segment, a subtitle end time point closest to the video end time point of the scene; then, select, from a difference between the closest subtitle start time point and a first start offset value and the video start time point of the scene, a later time point as the adjusted video start time point of the scene; and select, from a sum of the closest subtitle end time point and a first end offset value and the video end time point of the scene, an earlier time point as the adjusted video end time point of the scene. In this embodiment of this application, the electronic device adjusts the start time point and the end time point of the scene with reference to the start time point and the end time point of the subtitle segment, so that starting and ending of the scene can be smoother and more user-friendly.

In a possible design, a method in which the electronic device determines, based on the video start time point and the video end time point of the scene, the at least one subtitle segment corresponding to the scene may be: determining, from a plurality of subtitle segments, a first subtitle start time point closest to the video start time point of the scene, and determining, from the plurality of subtitle segments, a first subtitle end time point closest to the video end time point of the scene; and determining a subtitle segment falling between the first subtitle start time point and the first subtitle end time point, a first adjacent subtitle segment preceding a subtitle segment in which the first subtitle start time point is located, and a second adjacent subtitle segment following a subtitle segment in which the first subtitle end time point is located as subtitle segments corresponding to the scene.

The at least one subtitle segment that corresponds to the scene and that is determined in such manner can accurately reflect video content.

In a possible design, on one hand, the electronic device may select, from a difference between the first subtitle start time point and a second start offset value, a subtitle end time point of the first adjacent subtitle segment, and the video start time point of the scene, a latest time point as the adjusted video start time point of the scene; on the other hand, the electronic device selects, from a sum of a subtitle end time point of the first subtitle segment and a second end offset value, a subtitle end time point of the second adjacent subtitle segment, and the video end time point of the scene, an earliest time point as the adjusted video end time point of the scene.

In this embodiment of this application, the electronic device adjusts the start time point and the end time point of the scene by using subtitle content, so that the finally generated short video starts by gradually transitioning from the scene to a dialog, and ends as the scene ends. This is more user-friendly, and user experience is better.

In a possible design, the electronic device splits, based on a start time point and an end time point of each dialog in the subtitle file corresponding to the long video, the subtitle file corresponding to the long video; and then determines the subtitle start time point and the subtitle end time point of each split subtitle segment.

In another possible design, the electronic device determines, based on a start time point and an end time point of each dialog in the subtitle file corresponding to the long video, the subtitle start time point and the subtitle end time point of each split subtitle segment. In other words, the electronic device does not split the subtitle file.

In a possible design, the electronic device obtains a dialog start time point and a dialog end time point of each dialog from the subtitle file; and then performs the following operations starting from a first dialog in the subtitle file:

using a dialog start time of the first dialog as a subtitle start time point of the first subtitle segment; calculating a segmentation time point by shifting the dialog start time point of the first dialog backward by fixed duration, and if the segmentation time point falls within a dialog in the subtitle file, determining that a dialog end time point of the dialog in the subtitle file is a subtitle end time point of the first subtitle segment; or otherwise, selecting a dialog end time point of an adjacent dialog preceding the segmentation time point as a subtitle end time point of the first subtitle segment; and sequentially using the first dialog following a subtitle end time point of a previous subtitle segment as a current dialog, and performing the following operations on the current dialog: calculating a segmentation time point by shifting a dialog start time point of the current dialog backward by fixed duration; and if the segmentation time point falls within a dialog, determining that a dialog end time point of the dialog is a subtitle end time point of a current subtitle segment. In this embodiment of this application, the subtitle start time point and the subtitle end time point that are determined by the electronic device by using the foregoing method are relatively smooth, and this helps to adjust the start time point and a technical time point of the scene.

In a possible design, after the electronic device generates the plurality of short videos, the method further includes:

for any short video, determining, based on a video start time point and a video end time point of the short video, at least one subtitle segment corresponding to the short video; and if a proportion accounted for by total duration of the at least one subtitle segment in total duration of the short video is greater than a specified threshold, storing the short video; or otherwise, discarding the short video. In this embodiment of this application, according to the foregoing method, a short video in which a dialog is too short and cannot be used for English learning can be discarded, thereby helping to improve availability of a short video.

In a possible design, after the electronic device generates the plurality of short videos, the method further includes:
performing the following operation for any short video:

dividing sequence frame images in the short video into at least two parts, extracting N frames of images from each part to perform scene recognition, performing selection on scene recognition results of the N frames of images in each part, and using a scene recognition result, appearing most frequently, as label information of the part, where N is a positive integer greater than or equal to 1; and then, performing election on the label information of the at least two parts, and using label information, appearing most frequently, as label information of the short video.

In this embodiment of this application, a user can retrieve, based on the label information generated by using the foregoing method, a short video needed by the user, to accurately meet a learning requirement of the user.

According to a second aspect, an embodiment of this application provides an electronic device, including a processor and a memory. The memory is configured to store one or more computer programs. When the one or more computer programs stored in the memory are executed by the processor, the electronic device is enabled to implement the method in any possible design of the foregoing aspect.

According to a third aspect, an embodiment of this application further provides an apparatus. The apparatus includes a module/unit for performing the method in any possible design of the foregoing aspect. The module/unit may be implemented by using hardware, or may be implemented by hardware executing corresponding software.

According to a fourth aspect, an embodiment of this application further provides a computer readable storage medium. The computer readable storage medium includes a computer program, and when the computer program is run on an electronic device, the electronic device is enabled to perform the method in any possible design of the foregoing aspect.

According to a fifth aspect, an embodiment of this application further provides a computer program product. When the computer program product is run on a terminal, the electronic device is enabled to perform the method in any possible design of the foregoing aspect.

These aspects or other aspects of this application are more concise and understandable in the description of the following embodiments.

DESCRIPTION OF EMBODIMENTS

For ease of understanding, some concepts related to the embodiments of this application are described for reference by way of example. Details are as follows.

A subtitle file generally is a separate file independent of an audio/video file, and has a specific file format (for example, SRT, SSA, ASS, or SUP). The subtitle file includes time information and text information, where the time information can ensure that the subtitle file can be combined with an audio/video file data stream for display. Therefore, in a process of playing back the audio/video file and the subtitle file, audio/video data and subtitle content can be overlaid for playback based on a correspondence (for example, a timestamp in the audio/video file is consistent with a timestamp in a subtitle content attribute) between time information included in the audio/video file and the time information included in the subtitle file and a subtitle display parameter attribute.

The following describes the technical solutions in the embodiments of this application with reference to the accompanying drawings in the embodiments of this application. In the descriptions of the embodiments of this application, the terms "first" and "second" mentioned below are merely used for the purpose of description, but cannot be understood as an indication or implication of relative importance or implicit indication of a quantity of indicated technical features. Therefore, a feature limited by "first" or "second" may explicitly or implicitly include one or more features.

Figure 1:
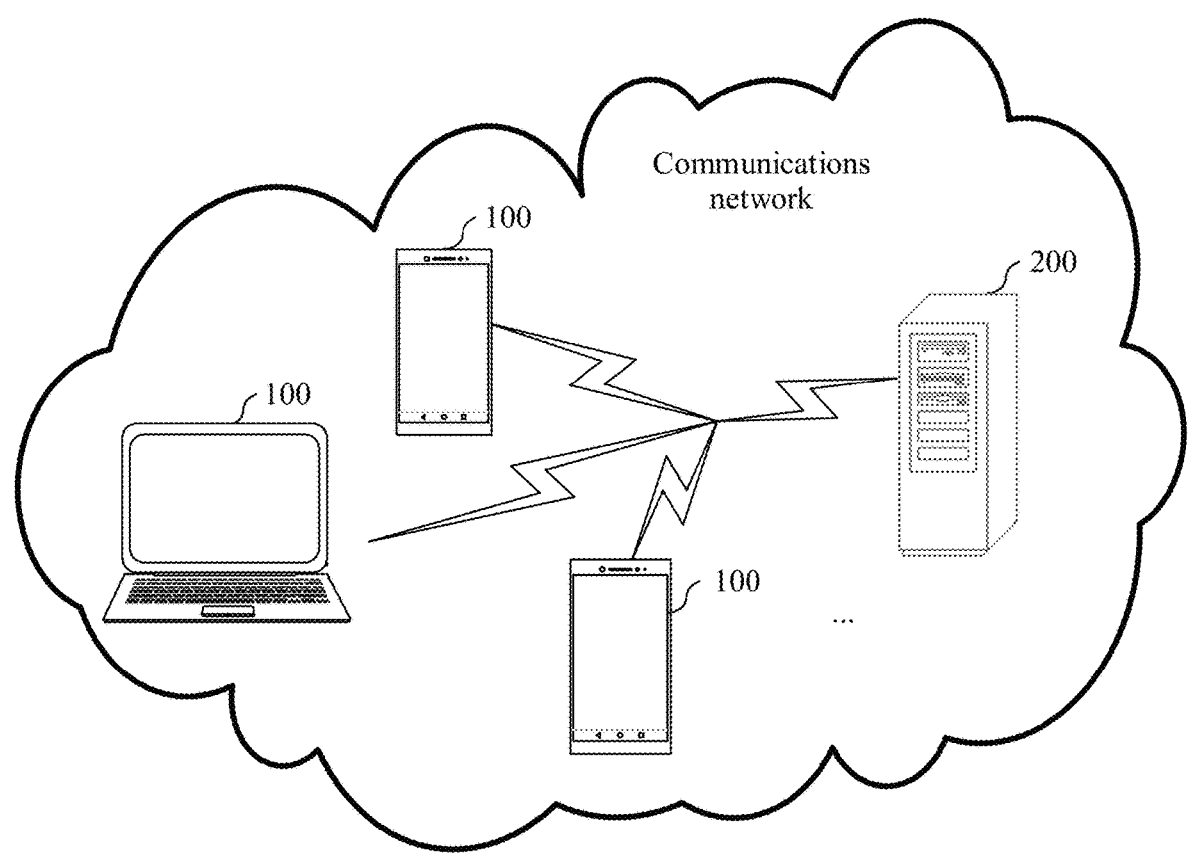
FIG. 1 is a schematic diagram of an interconnection scenario according to an embodiment of this application.

An image processing method provided in the embodiments of this application may be applied to a communications architecture shown in FIG. 1. The communications architecture includes a plurality of terminals 100 and a server 200. For example, the server 200 may process a long video into a plurality of short videos. A terminal 100 may obtain a short video from the server 200, and then play back the short video. Alternatively, a terminal 100 obtains a long video from the server 200, processes the long video into a plurality of short videos, and then plays back the short videos.

The terminals 100 and the server 200 may be interconnected by using a communications network. The communications network may be a local area network, or may be a wide area network connected by using a relay device. When the communications network is a local area network, for example, the communications network may be a short range communications network such as a Wi-Fi hotspot network, a Wi-Fi P2P network, a Bluetooth network, a Zigbee network, or a near field communication (NFC) network. When the communications network is a wide area network, for example, the communications network may be a 3rd generation wireless communications technology (3G) network a 4th generation mobile communications technology (4G) network, a 5th generation mobile communications technology (5G) network, a future evolved public land mobile network (PLMN), an internet, or the like. In the scenario shown in FIG. 1, different electronic devices may exchange data by using a communications network, for example, exchange a picture, a text, or a video, or exchange results obtained after the electronic devices process an object such as a picture, a text, or a video.

Figure 2:
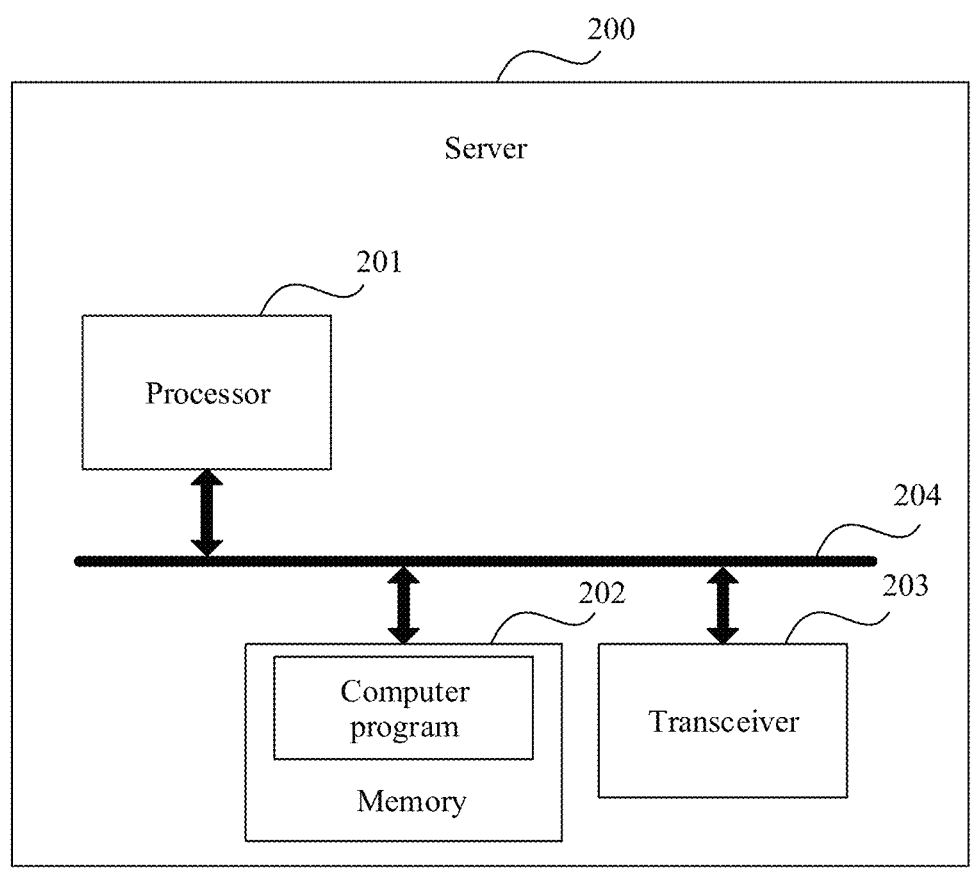
FIG. 2 is a schematic structural diagram of a server according to an embodiment of this application.

Specifically, in a scenario, if the server 200 can process a long video into a plurality of short videos, the server 200 may be a server or a cloud server that stores a long video and a subtitle file. FIG. 2 is a block diagram of a partial structure of the server 200 in the embodiments of this application.

As shown in FIG. 2, the server 200 may include a processor 201, a memory 202, and a transceiver 203. One or more computer programs are stored in the memory 202 and are configured to be executed by the one or more processors 201.

The processor 201 may be a central processing unit (CPU), a digital processing unit, or the like. The processor 201 is a control center of the server 200, is connected to all parts of the server by using various interfaces and lines, and performs various functions and video processing of the server 200 by running or executing a computer program stored in the memory 202, and invoking data such as a video and a subtitle file stored in the memory 202.

The processor 201 determines a video start time point and a video end time point of each scene from a long video, and then splits a subtitle file corresponding to the long video to generate a plurality of subtitle segments, where each of the subtitle segments includes a subtitle start time point and a subtitle end time point; for any scene, determines, based on a video start time point and a video end time point of the scene, at least one subtitle segment corresponding to the scene; and adjusts the video start time point and the video end time point of the scene based on the subtitle start time point and the subtitle end time point of the at least one subtitle segment, to obtain an adjusted video start time point and an adjusted video end time point of the scene, and splits the long video based on the adjusted video start time point and the adjusted video end time point of each scene, to generate a plurality of short videos.

The transceiver 203 is configured to send the short videos generated by the processor 201 to a terminal 100.

A specific connection medium between the processor 201 and the memory 202 is not limited in this embodiment of this application. In this embodiment of this application, in FIG. 2, the memory 202, the processor 201, and the transceiver 203 are connected by using a bus 204. The bus is represented by using a thick line in FIG. 2, and other connections between other components are merely described by way of example rather than limitation. The bus may be classified into an address bus, a data bus, a control bus, and the like. For ease of representation, only one thick line is used to represent the bus in FIG. 2, but this does not mean that there is only one bus or only one type of bus.

The memory 202 may be a volatile memory, for example, a random access memory (RAM). Alternatively, the memory 203 may be a non-volatile memory, for example, a read-only memory, a flash memory, a hard disk drive (HDD), or a solid-state drive (SSD). Alternatively, the memory 202 is any other medium that can be configured to carry or store program code in a form of an instruction or a data structure and that can be accessed by a computer, but is not limited thereto. The memory 202 may be a combination of the foregoing memories.

Figure 3:
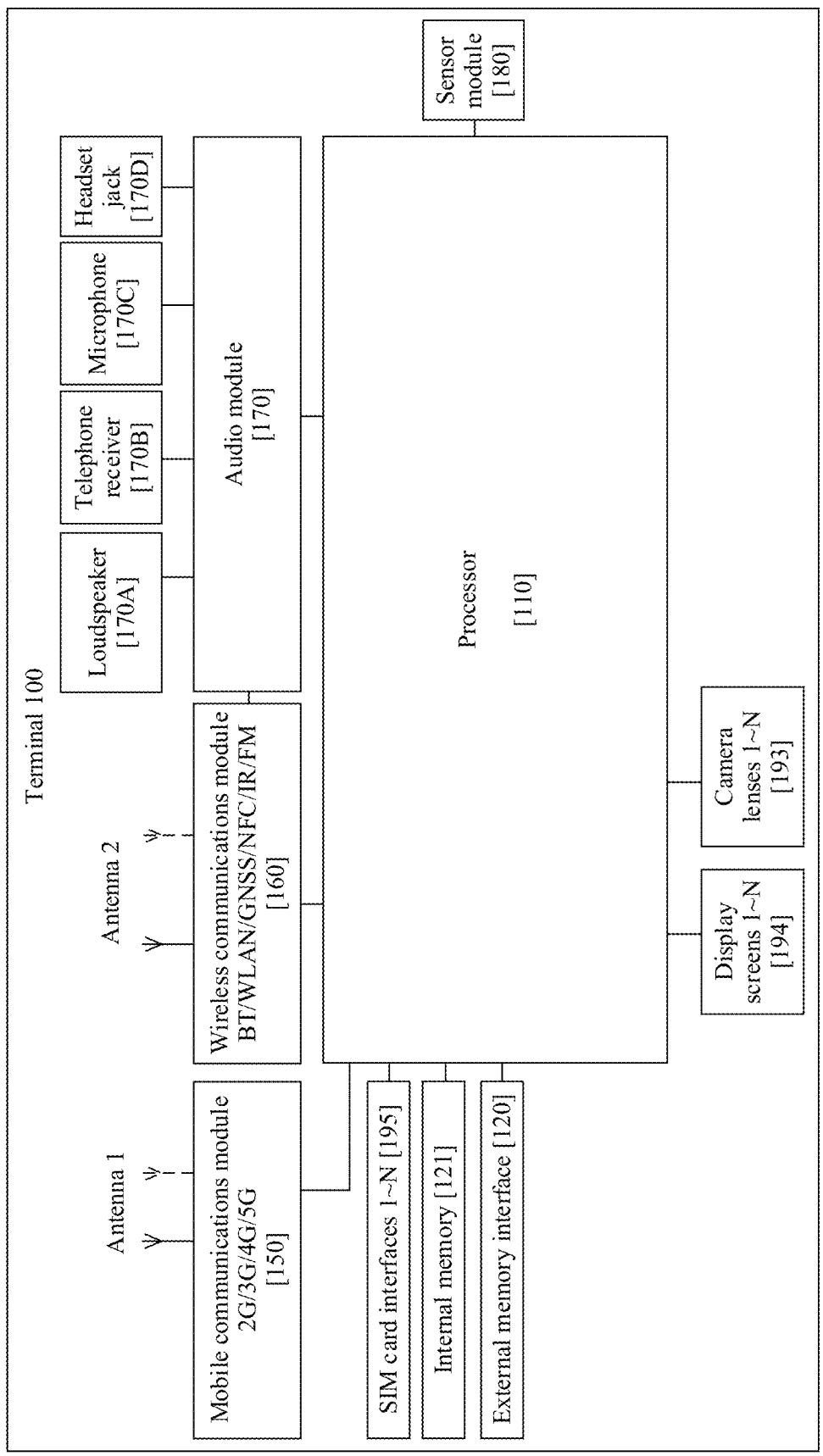
FIG. 3 is a schematic diagram of an inner structure of an electronic device according to an embodiment of this application.

Specifically, in another scenario, if the terminal 100 obtains a long video from the server 200, the terminal 100 processes the long video into a plurality of short videos, and then plays back the short videos. The terminal 100 may be a portable electronic device that further includes another function such as functions of a personal digital assistant and/or a music player, for example, a mobile phone, a tablet computer, or a wearable device (for example, a smartwatch) having a wireless communication function. An example embodiment of the portable electronic device includes but is not limited to a portable electronic device using iOS®, Android®, Microsoft®, or another operating system. The portable electronic device may be alternatively another portable electronic device, for example, a laptop having a touch-sensitive surface (for example, a touch panel). The following provides a description by using an example in which the terminal 100 is a mobile phone. FIG. 3 is a block diagram of a partial structure of the terminal 100 related to the embodiments of this application.

As shown in FIG. 3, the terminal 100 is a mobile phone. The mobile phone may include a processor 110, an external memory interface 120, an internal memory 121, a USB interface 130, a charging management module 140, a power management module 141, a battery 142, an antenna 1, an antenna 2, a mobile communications module 150, a wireless communications module 160, an audio module 170, a loudspeaker 170A, a telephone receiver 170B, a microphone 170C, a headset jack 170D, a sensor module 180, a button 190, a motor 191, an indicator 192, a camera lens 193, a display screen 194, a SIM card interface 195, and the like.

It may be understood that the example of the structure in this embodiment of this application does not specifically limit the terminal 100. In some other embodiments of this application, the terminal 100 may include more or fewer components than those shown in the figure, or some components may be combined, or some components may be split, or different component arrangements are used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be separate components, or may be integrated into one or more processors. In this embodiment of this application, the processor 110 is configured to: obtain a video start time point and a video end time point of each scene in a long video, adjust the video start time point and the video end time point of the scene based on a subtitle start time point and a subtitle end time point of a subtitle segment corresponding to the scene, to obtain an adjusted video start time point and an adjusted video end time point of the scene, and finally, split the long video based on the adjusted video start time point and the adjusted video end time point of each scene, to generate a plurality of short videos.

The controller may be a nerve center and a command center of the terminal 100. The controller may generate an operation control signal based on an instruction operation code and a time sequence signal, to complete control of a read instruction and an execution instruction.

A memory may be further disposed in the processor 110, to store an instruction and data. In some embodiments, the memory in the processor 110 is a cache. The memory may store an instruction or data that is just used or cyclically used by the processor 110. If the processor 110 needs to use the instruction or data again, the processor 110 may directly invoke the instruction or data from the memory, to avoid repeated access, reduce a waiting time of the processor 110, and improve system efficiency.

In some embodiments, the processor 110 may include one or more interfaces. The interface may include an integrated circuit (I2C) interface, an integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

A wireless communication function of the terminal 100 may be implemented by using the antenna module 1, the antenna module 2, the mobile communications module 150, the wireless communications module 160, the modem processor, the baseband processor, and the like.

The antenna 1 and the antenna 2 are configured to transmit and receive electromagnetic wave signals. Each antenna of the terminal 100 may be configured to cover a single or a plurality of communication frequency bands. Different antennas may be reused, to improve utilization of the antennas. For example, a cellular antenna may be reused as a diversity antenna of a wireless local area network. In some other embodiments, the antenna may be combined with a tuning switch for use.

The mobile communications module 150 may provide a solution of 2G/3G/4G/5G wireless communication and the like applied to the terminal 100. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit the processed electromagnetic wave to the modem processor for demodulation. The mobile communications module 150 may further amplify a signal modulated by the modem processor, and convert the signal into an electromagnetic wave and radiate the electromagnetic wave through the antenna 1. In some embodiments, at least some function modules of the mobile communications module 150 may be disposed in the processor 110. In some embodiments, at least some function modules of the mobile communications module 150 may be disposed in a same component as at least some modules of the processor 110.

The modem processor may include a modulator and a demodulator. The modulator is configured to modulate a to-be-sent low-frequency baseband signal into an intermediate-and-high frequency signal. The demodulator is configured to demodulate a received electromagnetic wave signal into a low-frequency baseband signal. Subsequently, the demodulator transmits the low-frequency baseband signal obtained through demodulation to the baseband processor for processing. The low-frequency baseband signal is transmitted to the application processor after being processed by the baseband processor. The application processor outputs a voice signal through an audio device (which is not limited to the loudspeaker 170A and the telephone receiver 170B), or displays an image or a video through the display screen 194. In some embodiments, the modem processor may be a separate component. In some other embodiments, the modem processor may be independent of the processor 110, and may be disposed in a same component as the mobile communications module 150 or another function module.

The wireless communications module 160 may provide a solution of wireless communication applied to the terminal 100, for example, a wireless local area network (WLAN), Bluetooth (BT), a global navigation satellite system (GNSS), frequency modulation (FM), a near field wireless communication technology (NFC), or an infrared technology (IR). The wireless communications module 160 may be one or more components integrated into at least one communication processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave and radiate the electromagnetic wave through the antenna 2. In this embodiment of this application, the terminal 100 obtains data such as a long video and a subtitle file from the server 200 by using the wireless communications module 160.

In some embodiments, the antenna 1 of the terminal 100 is coupled to the mobile communications module 150, and the antenna 2 is coupled to the wireless communications module 160, so that the terminal 100 can communicate with a network and another device by using a wireless communications technology. The wireless communications technology may include global system for mobile communications (GSM), general packet radio service (GPRS), code division multiple access (CDMA), wideband code division multiple access (WCDMA), time-division code division multiple access (TD-SCDMA), long term evolution (LTE), BT, GNSS, WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

The terminal 100 implements a display function by using the GPU, the display screen 194, the application processor, and the like. The GPU is a microprocessor for image processing, and connects the display screen 194 and the application processor. The GPU is configured to perform mathematical and geometrical calculation, and is configured for graphics rendering. The processor 110 may include one or more GPUs, and execute a program instruction to generate or change display information. In this embodiment of this application, the terminal 100 plays back and displays a short video by using the GPU, the display screen 194, the application processor, and the like.

The display screen 194 is configured to display an image, a video, and the like. The display screen 194 includes a display panel. The display panel may use a liquid crystal display (LCD), an organic light-emitting diode (OLED), an active-matrix organic light emitting diode (AMOLED), a flexible light-emitting diode (FLED), a MiniLED, a MicroLED, a Micro-oLED, quantum dot light emitting diodes (QLED), and the like. In some embodiments, the terminal 100 may include one or N display screens, where N is a positive integer greater than 1.

The terminal 100 may implement a photographing function by using the ISP, the camera lens 193, the video codec, the GPU, the display screen 194, the application processor, and the like.

The ISP is configured to process data fed back by the camera lens 193. For example, during photographing, a shutter is opened, light is transmitted to a light-sensitive element of the camera lens through a lens, an optical signal is converted into an electrical signal, and the light-sensitive element of the camera lens transmits the electrical signal to the ISP for processing, to convert the electrical signal into an image visible to naked eyes. The ISP may further perform algorithm optimization on noise, luminance, and complexion of an image. The ISP may further optimize parameters such as exposure and a color temperature of a photographing scenario. In some embodiments, the ISP may be disposed in the camera lens 193.

The camera lens 193 is configured to capture a static image or a video. For a body, a lens generates an optical image and projects the image to the light-sensitive element. The light-sensitive element may be a charge coupled device (CCD) or a complementary metal-oxide-semiconductor (CMOS) photoelectric transistor. The light-sensitive element converts an optical signal into an electrical signal, and then transmits the electrical signal to the ISP for conversion into a digital image signal. The ISP outputs the digital image signal to the DSP for processing. The DSP converts the digital image signal into an image signal in a standard format such as RGB or YUV. In some embodiments, the terminal 100 may include one or N camera lenses, where N is a positive integer greater than 1.

The digital signal processor is configured to process a digital signal, and may further process another digital signal in addition to a digital image signal. For example, when the terminal 100 performs frequency selection, the digital signal processor is configured to perform Fourier transform and the like on frequency energy.

The video codec is configured to compress or decompress a digital video. The terminal 100 may support one or more video codecs. In this way, the terminal 100 may play back or record videos in a plurality of encoding formats, for example, MPEG1, MPEG2, MPEG3, and MPEG4.

The NPU is a neural-network (NN) computing processor, and quickly processes input information by learning from a biological neural network structure, for example, by learning from a mode of transmission between brain nerve cells, and may further perform constant self-learning. An application of intelligent cognition of the terminal 100, for example, image recognition, facial recognition, voice recognition, and text understanding, may be implemented by using the NPU.

The external memory interface 120 may be configured to connect to an external storage card, for example, a Micro SD card, to extend a storage capability of the terminal 100. The external storage card communicates with the processor 110 through the external memory interface 120, to implement a data storage function, for example, store files such as music and a video into the external storage card.

The internal memory 121 may be configured to store computer executable program code, where the executable program code includes an instruction. The processor 110 runs the instruction stored in the internal memory 121, to perform various function applications and data processing of the terminal 100. The memory 121 may include a program storage region and a data storage region. The program storage region may store an operating system, an application required by at least one function (for example, a voice playback function, or an image playing function), and the like. The data storage region may store data (for example, audio data and an address book) and the like created in a process of using the terminal 100. In addition, the memory 121 may include a high-speed random access memory, or may include a non-volatile memory, for example, at least one magnetic disk storage component, a flash memory, or a universal flash storage (UFS).

The terminal 100 may implement an audio function, for example, music playback or recording, by using the audio module 170, the loudspeaker 170A, the telephone receiver 170B, the microphone 170C, the headset jack interface 170D, the application processor, and the like.

The audio module 170 is configured to convert digital audio information into an analog audio signal, and is further configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The loudspeaker 170A, also referred to as a "speaker", is configured to convert an audio electrical signal into a voice signal. Music may be listened to or a call may be answered in a hands-free manner by using the loudspeaker 170A of the terminal 100.

The telephone receiver 170B, also referred to as a "receiver", is configured to convert an audio electrical signal into a voice signal. When a call is answered or voice information is received by using the terminal 100, the telephone receiver 170B may be put close to a human ear, to receive voice.

The microphone 170C, also referred to as a "microphone" or a "microphone", is configured to convert a voice signal into an electrical signal. When making a call or sending voice information, a user may speak with the mouth approaching the microphone 170C, to input a voice signal to the microphone 170C. At least one microphone 170C may be disposed in the terminal 100. In some other embodiments, two microphones may be disposed in the terminal 100, and not only a voice signal is collected, but also a noise-canceling function can be implemented. In some other embodiments, three, four, or more microphones may be disposed in the terminal 100, to collect a voice signal, cancel noise, recognize a voice source, implement a directional recording function, and the like. In this embodiment of this application, the microphone 170C may be configured to collect a voice of a user, for example, a first voice of a first user in a first language.

A software structure of the terminal 100 is described in the embodiments of this application by using an Android system with a layered architecture as an example.

Figure 4:
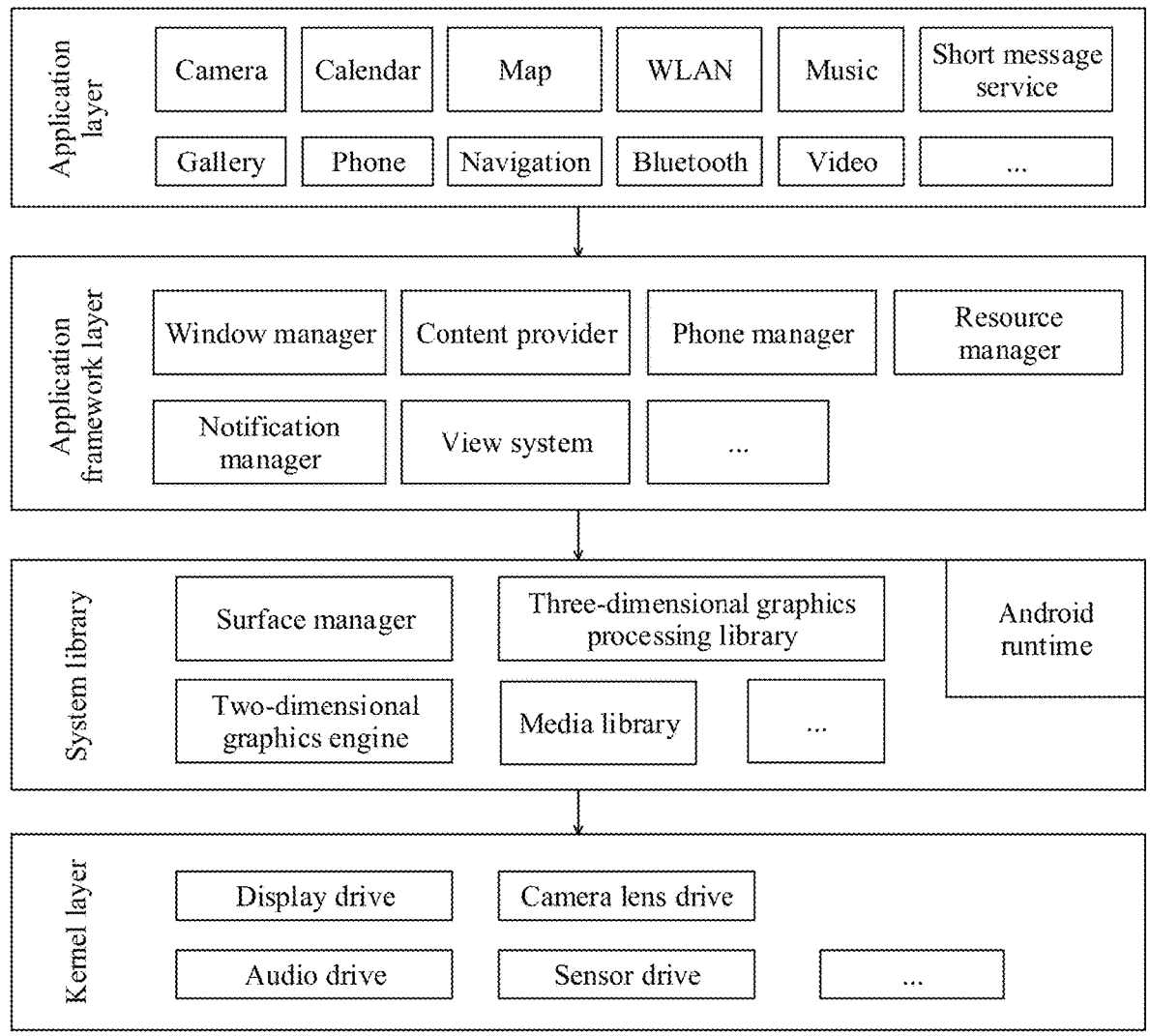
FIG. 4 is a schematic structural diagram of an Android operating system according to an embodiment of this application.

FIG. 4 is a software structural block diagram of the terminal 100 according to an embodiment of the present invention.

The layered architecture divides software into several layers, and each layer has a clear role and task. Layers communicate with each other by using a software interface. In some embodiments, the Android system is divided into four layers, namely, an application layer, an application framework layer, an Android runtime and system library, and a kernel layer from up to down.

The application layer may include a series of application packages.

As shown in FIG. 4, the application packages may include applications such as telephone, camera, gallery, calendar, call, map, navigation, WLAN, Bluetooth, music, video, and short message service.

The application framework layer provides an application programming interface (API) and a programming framework for applications at the application layer. The application framework layer includes some predefined functions.

As shown in FIG. 4, the application framework layer may include a window manager, a content provider, a view system, a telephone manager, a resource manager, a notification manager, and the like.

The window manager is configured to manage a window application. The window manager may obtain a size of a display screen, determine whether there is a status bar, lock the screen, capture a screen, and the like.

The content provider is configured to store and obtain data, and enable the data to be accessed by an application. The data may include a video, an image, an audio, dialed and answered calls, a browsing history and favorites, an address book, and the like.

The view system includes visual controls, for example, a control of displaying text and a control of displaying a picture. The view system may be configured to construct an application. The display interface may include one or more views. For example, a display interface including a short message service message notification icon may include a view of displaying text and a view of displaying a picture.

The telephone manager is configured to provide a communication function of the terminal 100, for example, manage a call status (including answering or hanging up).

The resource manager provides various resources for an application, for example, a localized character string, an icon, a picture, a layout file, and a video file.

The notification manager enables an application to be capable of displaying notification information on a status bar, conveying a message of a notification type, and automatically disappearing after a short stay without interacting with a user. For example, the notification manager is configured to notify a completed download, a message prompt, and the like. The notification manager may be a notification that appears on a top status bar of the system in a form of a graph or a scroll bar text, for example, a notification of an application running on the background, or may be a notification that appears on the screen in a form of a dialog window. For example, text information is prompted on a status bar, a prompt tone is played, the electronic device vibrates, or an indicator light flashes.

The Android runtime includes a kernel library and a virtual machine. The Android runtime is responsible for scheduling and management of the Android system.

The kernel library includes two parts: One part is a performance function that the java language needs to schedule, and the other part is the kernel library of the Android runtime.

The application layer and the application framework layer run on the virtual machine. The virtual machine executes java files of the application layer and the application framework layer as binary files. The virtual machine is configured to execute functions such as life cycle management of an object, stack management, thread management, security and abnormality management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to manage a display subsystem, and provide convergence of 2D and 3D layers for a plurality of applications.

The media library supports playback and recording of a plurality of common audio and video formats, a static image file, and the like. The media library may support a plurality of audio and video coding formats, for example, MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine of 2D drawing.

The kernel layer is a layer between hardware and software. The kernel layer includes at least a display drive, a camera lens drive, an audio drive, and a sensor drive.

In the prior art, a long video usually is split into a plurality of short videos, and English learning is performed by using the short videos. Currently, most long videos are split manually, and this is prone to errors and high labor costs. In addition, currently, a long video is split by using a subtitle file. To be specific, a start time of a subtitle segment is a start time of a short video, and an end time of the subtitle segment is an end time of the short video. In this way, a possible effect of generating a short video in such manner is that a dialog ends, and an image of a scene is forced to end suddenly although it is still in progress. For example, in a long video, Steve is still waving after saying "see you again." However, in a short video captured by using the foregoing method, the short video may end after Steve says goodbye, and an image showing that Steve is waving is not included. It can be learned that a short video generated in the prior art has a problem that a dialog starts or ends relatively abruptly, and user experience is poor.

To resolve the foregoing problem, in the embodiments of this application, on one hand, a video start time point of a short video is determined by using a video start time point of each scene in a long video and a subtitle start time point of a subtitle segment corresponding to the scene; on the other hand, a video end time point of the short video is determined by using a video end time point of the scene in the long video and a subtitle end time point of the subtitle segment corresponding to the scene, so that the long video is finally split into a plurality of independent short videos. In addition, a dialog in a generated short video starts or ends relatively smoothly rather than abruptly, thereby improving user experience.

The following describes, in detail with reference to the accompanying drawings and an application scenario, the video splitting method provided in the embodiments of this application.

Figure 5:
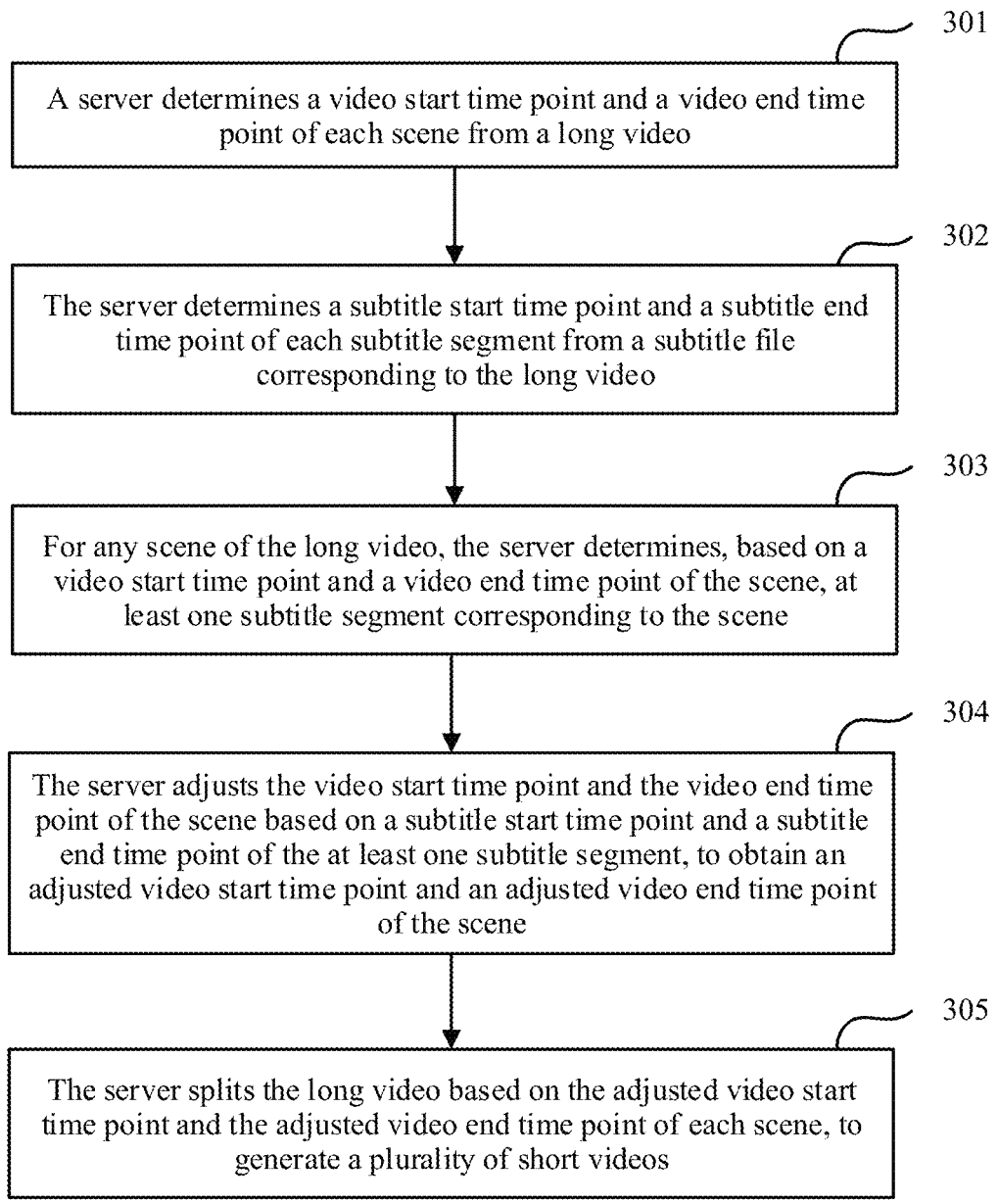
FIG. 5 is a schematic flowchart of a video splitting method according to an embodiment of this application.

FIG. 5 shows an example of a process of a video splitting method according to an embodiment of this application. The following embodiment is described by using an example in which the method is performed by a server. The method includes the following steps.

Step 301. The server determines a video start time point and a video end time point of each scene from a long video.

The long video is sequence frames formed based on a chronological sequence of playback start time points. For example, the long video is a video resource of the movie "Titanic". If there are more than 100 scene switching in the video resource of the "Titanic", the server may record a video start time point and a video end time point of each scene in the video resource of the "Titanic", to obtain information about the plurality of scenes, as shown in Table 1.

TABLE 1

| Segment number | Video start time point (millisecond) | Video end time point (millisecond) |
|---|---|---|
| 1 | 00:05:18:266 | 00:06:00:120 |
| 2 | 00:06:00:121 | 00:06:58:990 |
| 3 | 00:06:58:991 | 00:07:13:378 |
| ... | ... | ... |

In Table 1, for a scene whose segment number is 1, a video start time point is 00:05:18:266, and a video end time point is 00:06:00:120; for a scene whose segment number is 2, a video start time point is 00:06:00:121, and a video end time point is 00:06:58:990; and for a scene whose segment number is 3, a video start time point is 00:06:58:991, and a video end time point is 00:07:13:378.

It should be noted that the server splits the scenes in the long video in a preset process. The preset process may be a pixel domain method, a histogram method, a block matching method, an edge change method, or the like in a pixel domain-based method, or may be a discrete cosine transform (DCT) coefficient method, a wavelet transform method, a spatio-temporal analysis method, a vector quantization method, a motion vector method, or the like in a compressed domain-based method. This is not specifically limited in this embodiment of this application.

Step 302. The server determines a subtitle start time point and a subtitle end time point of each subtitle segment from a subtitle file corresponding to the long video.

Method 1: The server may directly split the subtitle file of the long video into a plurality of subtitle segments by using fixed duration as a reference value. For example, the server splits a subtitle file of the movie "Titanic" to obtain a plurality of subtitle segments. It is assumed that total duration of the subtitle file of "Titanic" is about 3000 seconds. The server may split the subtitle file of "Titanic" into about 100 subtitle segments by using fixed duration of 30s as a reference value, as shown in Table 2.

TABLE 2

| Segment number | Subtitle start time point (millisecond) | Subtitle end time point (millisecond) |
|---|---|---|
| 1 | 00:05:20:223 | 00:05:50: 223 |
| 2 | 00:06:30:556 | 00:07:00:556 |
| 3 | 00:07:12:552 | 00:07:42:552 |
| ... | ... | ... |

In Table 2, for a subtitle segment whose segment number is 1, a subtitle start time point is 00:05:20:223, and a subtitle end time point is 00:05:50:223; for a subtitle segment whose segment number is 2, a subtitle start time point is 00:06:30:556, and a subtitle end time point is 00:07:00:556; and for a subtitle segment whose segment number is 3, a subtitle start time point is 00:07:12:552, and a subtitle end time point is 00:07:42:552.

Method 2: In Method 1, a subtitle end time point of a subtitle segment obtained by the server through splitting based on the fixed duration 30s may not be an end time point of a dialog, and this affects dialog integrity of a finally generated short video. Therefore, after completing the method steps in Method 1, the server may further adjust the subtitle start time point and the subtitle end time point of the subtitle segment based on a start time point and an end time point of each dialog in the subtitle file, so that the subtitle start time point of each subtitle segment is a start time point of a dialog, and the subtitle end time point of the subtitle segment is an end time point of the dialog or another dialog. For example, after the subtitle start time point and the subtitle end time point in Table 2 are adjusted according to the foregoing method, time information of subtitle segments is shown in Table 3.

TABLE 3

| Segment number | Subtitle start time point (millisecond) | Subtitle end time point (millisecond) |
|---|---|---|
| 1 | 00:05:20:223 | 00:06:01:123 |
| 2 | 00:06:30:556 | 00:06:57:887 |
| 3 | 00:07:12:552 | 00:07:46:338 |
| ... | ... | ... |

In Table 3, for a subtitle segment whose segment number is 1, a subtitle start time point is 00:05:20:223, and a subtitle end time point is 00:06:01:123; for a subtitle segment whose segment number is 2, a subtitle start time point is 00:06:30:556, and a subtitle end time point is 00:06:57:887; and for a subtitle segment whose segment number is 3, a subtitle start time point is 00:07:12:552, and a subtitle end time point is 00:07:46:338.

Method 3: The server may not split the subtitle file, but records a subtitle start time point and a subtitle end time point of each subtitle segment only based on fixed duration and a start time point and an end time point of each dialog in the subtitle file. For example, the server obtains a start time point and an end time point of each dialog in the subtitle file of the movie "Titanic", and sequentially calculates a subtitle start time point and a subtitle end time point of each subtitle segment by using 30s as fixed duration and with reference to the start time point and the end time point of each dialog in the subtitle file, to finally generate a table including time information corresponding to each subtitle segment. For a specific calculation process, refer to a specific process shown in FIG. 6 below.

It should be noted that the server may perform step 301 before step 302, or may perform step 302 before step 301, or the server performs step 301 and step 302 at the same time. This is not specifically limited in this embodiment of this application.

Step 303. For any scene of the long video, the server determines, based on a video start time point and a video end time point of the scene, at least one subtitle segment corresponding to the scene.

The at least one subtitle segment corresponding to the scene includes at least one dialog in the subtitle file. In other words, if the scene corresponds to one subtitle segment, the subtitle segment includes one or more dialogs, or if the scene corresponds to two subtitle segments, the two subtitle segments may include one dialog together.

For example, a scene whose segment number is 2 in Table 1 is used as an example. The server determines, based on a video start time point and a video end time point of the scene whose segment number is 2, a segment number of a subtitle file that falls within a time period [00:06:00:121, 00:06:58: 990] is 2. The server determines that segment numbers of subtitle files adjacent to the segment number 2 are a segment number 1 and a segment number 3. Further, the server determines that subtitle segments corresponding to the scene whose segment number is 2 are respectively the subtitle segment corresponding to the segment number 1, the subtitle segment corresponding to the segment number 2, and the subtitle segment corresponding to the segment number 3.

It should be noted that one scene may correspond to a plurality of subtitle segments at the same time, or a plurality of scenes may correspond to a same subtitle segment. For example, total duration of a scene is 70 seconds. It is assumed that there are two subtitle segments within the 70 seconds duration. One scene corresponds to four subtitle segments, plus two adjacent subtitle segments. It is also possible that duration of a scene is 15 seconds, total duration of a subtitle segment including the duration of the scene is 40 seconds, and both the scene and another adjacent scene correspond to the subtitle segment. In other words, in this embodiment of this application, a one-to-many correspondence, or a many-to-one correspondence, or a many-to-many correspondence may exist between scenes and subtitle segments.

Step 304. The server adjusts the video start time point and the video end time point of the scene based on a subtitle start time point and a subtitle end time point of the at least one subtitle segment, to obtain an adjusted video start time point and an adjusted video end time point of the scene.

Specifically, in Method 1, the server may determine, from the at least one subtitle segment, a subtitle start time point closest to the video start time point of the scene, and determine, from the at least one subtitle segment, a subtitle end time point closest to the video end time point of the scene.

Then, on the one hand, the server selects, from a difference between the closest subtitle start time point and a first specified offset value and the video start time point of the scene, a later time point as the adjusted video start time point of the scene; on the other hand, selects, from a sum of the closest subtitle end time point and a second specified offset value and the video end time point of the scene, an earlier time point as the adjusted video end time point of the scene.

To be specific, it is assumed that the subtitle segments corresponding to the scene whose segment number is 2 are respectively: the subtitle segment corresponding to the segment number 1, the subtitle segment corresponding to the segment number 2, and the subtitle segment corresponding to the segment number 3. The server determines that the subtitle start time point closest to the video start time point 00:06:00:121 of the scene is 00:06:30:556, and determines that the subtitle end time point closest to the video end time point 00:06:58:990 of the scene is 00:07:00:556. Then, the server selects, from a difference between the subtitle start time point 00:06:30:556 and a first start offset value and the video start time point of the scene corresponding to the segment number 2, a later time point as the adjusted video start time point. For example, the first start offset value is 3s, and MAX (00:06:30:556-00:00:03:000, 00:06:00:121)=00: 06:27:556. Therefore, the adjusted video start time point is 00:06:27:556. In addition, the server selects, from a sum of the subtitle end time point 00:07:00:556 and a first end offset value and the video end time point of the scene corresponding to the segment number 2, an earlier time point as the adjusted video end time point. For example, MIN (00:06: 57:887+3, 00:06:58:990)=00:06:58:990. Therefore, the adjusted video end time point is 00:06:58:990.

Method 2: The server may calculate a video start time point and a video end time point of a final short video according to the following formula 1 and formula 2:

$$CB\_START=MAX(Sub\text{-}B\_START-CONTEXT\_DELAY\_IN,PREV\_DIALOG\_END,SB\_START)$$ formula 1, where CB_START is a video start time point of a short video, Sub-B_START is a subtitle start time point of a subtitle segment, CONTEXT_DELAY_IN is s second start offset value, PREV_DIALOG_END is a subtitle end time point of a previous subtitle segment, and SB_START is a video start time point of a scene; and $$CB\_END=MIN(Sub\text{-}B\_END+CONTEXT\_DELAY\_OUT,NEXT\_DIALOG\_START,SB\_END)$$ formula 2, where CB_END is a video end time point of the short video, Sub-B_END is a subtitle start time point of the subtitle segment, CONTEXT_DELAY_OUT is s second end offset value, NEXT_DIALOG_START is a start time point of a next subtitle segment, and SB_END is a video start time point of the scene.

For example, it is assumed that the subtitle segments corresponding to the scene whose segment number is 2 are respectively the subtitle segment corresponding to the segment number 1, the subtitle segment corresponding to the segment number 2, and the subtitle segment corresponding to the segment number 3, and both the second offset value and the second end offset value are three seconds. On one hand, the server selects, according to Table 1 and Table 3 and from a difference between a subtitle start time point of the subtitle segment corresponding to the segment number 2 and the offset value, a subtitle end time point of the subtitle segment corresponding to the segment number 1, and a video start time point of the scene corresponding to the segment number 2, a latest time point as the adjusted video start time point. For example, MAX (00:06:30:556-00:00: 03:000, 00:06:01:123, 00:06:00:121)=00:06:27:556.

On the other hand, the server selects, from a sum of a subtitle end time point of the subtitle segment corresponding to the segment number 2 and the offset value, a subtitle end time point of the subtitle segment corresponding to the segment number 3, and a video end time point of the scene corresponding to the segment number 2, an earliest time point as the adjusted video end time point. For example, MIN (00:06:57:887+3, 00:07:12:552, 00:06:58:990)=00:06:58:990. Therefore, the final video start time point and the final video end time point of the scene whose segment number is 2 can be obtained, as shown in Table 4.

TABLE 4

| Segment number | Video start time point (millisecond) | Video end time point (millisecond) |
|---|---|---|
| 1 | ... | ... |
| 2 | 00:06:27:556 | 00:06:58:990 |
| 3 | ... | ... |

Step 305. The server splits the long video based on the adjusted video start time point and the adjusted video end time point of each scene, to generate a plurality of short videos.

For example, the server splits the video resource of the movie "Titanic" based on the video start time point and the video end time point in Table 4, to generate a short video corresponding to duration [00:06:27:556, 00:06:58:990]. After the server generates the short video according to the foregoing steps, a terminal may send an invoking request to a user according to an instruction of the user, obtain a corresponding short video from the server, and play back the corresponding short video on the terminal.

In addition, a subtitle segment corresponding to the times points of the short video whose segment number is 2 in Table 4 is a subtitle segment 2. In this way, the short video finally generated by the server may include both video content corresponding to duration [00:06:27:556, 00:06:58:990] and dialog content of the subtitle segment corresponding to duration [00:06:30:556, 00:06:57:887]. A short video generated in such manner starts by gradually transitioning from a scene to a dialog. When the dialog ends, the video does not end immediately but ends as the scene ends. This is more user-friendly, and user experience is better.

In a possible design, if duration of a dialog in a subtitle segment in a short video is too short, for example, duration of a dialog in a 10-minute short video is only five seconds or only 10 seconds, it is most likely that the short video fails to facilitate English learning. Therefore, in this embodiment of this application, after step 304, duration of a subtitle segment corresponding to a short video may be further determined, and if the duration is less than a specified proportion of total duration of the short video, for example, less than 70% of the total duration, the short video is discarded, or otherwise, the short video is saved. A short video generated in such manner is more helpful to English learning.

Figure 6:
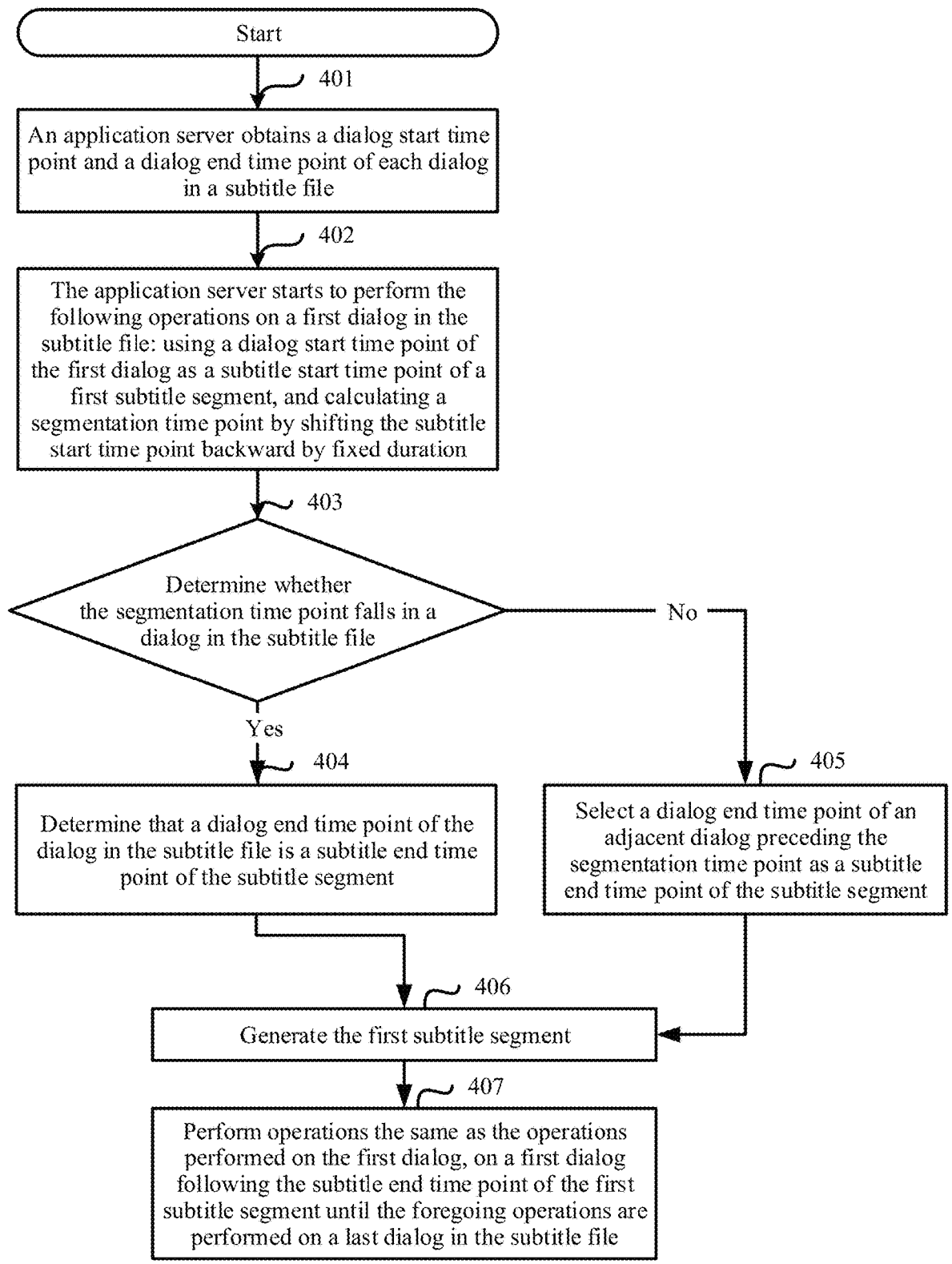
FIG. 6 is a schematic flowchart of a subtitle splitting method according to an embodiment of this application.

In a possible design, in implementation methods of Method 2 and Method 3 of step 302, the server may determine a subtitle start time point and a subtitle end time point of each subtitle segment according to a method process shown in FIG. 6. Specific steps are as follows:

Step 401: The server obtains a dialog start time point and a dialog end time point of each dialog in a subtitle file.

For example, Table 5 is partial content of a subtitle file of "Titanic", where for a first dialog, a dialog start time point is 00:01:56,350, and a dialog end time point is 00:01:58,900; for a second dialog, a dialog start time point is 00:02:12,000, and a dialog end time point is 00:02:14,500; for a third dialog, a dialog start time point is 00:02:16,120, and a dialog end time point is 00:02:17,500; and so on.

TABLE 5

1
00:01:56,350 --> 00:01:58,900
Thirteen meters. You should see it.
2
00:02:12,000 --> 00:02:14,500
Okay, take her up and over the bow rail.
3
00:02:16,120 --> 00:02:17,500
Okay, Mir-2...
4
00:02:17,500 --> 00:02:19,830
We're going over the bow. Stay with us.
5
00:02:53,500 --> 00:02:55,700
Okay, quiet. We're rolling.
6
00:02:56,210 --> 00:02:59,400
Seeing her coming out of the darkness like a ghost ship
7
00:02:59,680 --> 00:03:01,810
still gets me every time.

Step 402: The server starts to perform the following operations on the first dialog in the subtitle file: using a dialog start time point of the first dialog as a subtitle start time point of the first subtitle segment, and calculating a segmentation time point by shifting the subtitle start time point backward by fixed duration.

Step 403: Determine whether the segmentation time point falls in a dialog in the subtitle file, and if the segmentation time point falls in the dialog in the subtitle file, perform step 304, or if the segmentation time point does not fall in the dialog in the subtitle file, perform step 305.

Step 404: If the segmentation time point falls in the dialog in the subtitle file, determine that a dialog end time point of the dialog in the subtitle file is a subtitle end time point of the subtitle segment.

Step 405: If the segmentation time point does not fall in the dialog, select a dialog end time point of an adjacent dialog preceding the segmentation time point as a subtitle end time point of the subtitle segment.

Step 406. Generate the first subtitle segment.

Step 407: Perform the foregoing operations again on the first dialog following the subtitle end time point of the first subtitle segment until the foregoing operations are performed on the last dialog in the subtitle file.

For example, in Table 5, a dialog start time point 00:01:56,350 of the first dialog is a start time point of the subtitle segment. It is assumed that fixed duration is 30s. The dialog start time point of the first dialog is shifted backward by 30s to obtain a segmentation time point 00:02:26,350, and the segmentation time point does not fall in a dialog. Therefore, a dialog end time point 00:02:19,830 of the adjacent fourth segment preceding the segmentation time point is selected as a subtitle end time point of the subtitle segment.

It should be noted that in a possible design, in this embodiment of this application, scenario recognition may be further performed on a short video generated in the foregoing steps, to generate label information corresponding to a scene, for example, information such as a scenario label, a subtitle label, and a segment number. Specifically, for each short video, the server splits the short video into a plurality of parts, and extracts a plurality of frames of images from each part. Then, the server performs scenario recognition on the extracted plurality of frames of images, and uses label information that appears most frequently in a scenario recognition result as label information of the short video. Finally, in addition to generating the short video, the server further stores a correspondence between a short video and label information. This helps the server to retrieve the short video needed by the user.

For example, a short video corresponding to a segment 2 is used as an example, sequence frame images in the short video are split into five parts in a time sequence, and then, 20 frames of images are extracted from each part. Scenario recognition is performed on 20 frames of images in each part based on the following three dimensions, to generate label information of each frame of image. The three dimensions are respectively as follows: The first dimension is an environment in which an object in an image is located: indoor, outdoor, and others. The second dimension is a specific type of the indoor, for example, home, restaurant, meeting room, museum, school, plane, taxi, or ship, and a specific type of the outdoor, for example, street, scenic spot, park, or farm. Currently, the second dimension in this embodiment of this application is roughly divided into 69 types. The third dimension is a specific object that appears in an image, for example, a dining table, a coffee cup, a dress, a shoe, a tie, or a seat. Currently, the third dimension in this embodiment of this application is roughly divided into 360 types.

It can be learned that scenario recognition performed on the 20 frames of images in each part is essentially hierarchical processing from "coarse" to "fine". In this way, the server may perform election on label information that is 20 frames of images in the first part and that is recognized by using the foregoing method, and elect label information that appears most frequently as label information of the part. For example, for the part, label information, elected by the server, in the first dimension is indoors, label information, selected by the server, in the second dimension is in a guest room, and label information, elected by the server, in the third dimension is a tea cup. By analogy, the server determines label information of the remaining four parts, and then performs election on the label information of the five parts in a same manner to use label information that appears most frequently as label information of the short video.

In addition, in a possible design, in this embodiment of this application, the server may further summarize content of a subtitle segment corresponding to a short video, to generate a content description corresponding to the short video. For example, it is assumed that the subtitle segment corresponding to the short video is the first dialog to the fourth dialog in Table 4, the server may generate a subtitle label "the Mir-2 appears" by summarizing the four dialogs. Alternatively, in another possible design, in this embodiment of this application, the server may further generate a subtitle label corresponding to the short video by using a keyword, a word, or a phrase of the subtitle segment corresponding to the short video. For example, it is assumed that the subtitle segment corresponding to the short video includes the English word "check", the server may use English "check" as a subtitle label of the short video. When a user enters the keyword "check", the server may retrieve the short video. For another example, it is assumed that the subtitle segment corresponding to the short video includes a phrase "a lot of", the server may use English "a lot of" as a subtitle label of the short video. When a user enters the phrase "a lot of", the short video can be retrieved.

It should be noted that the methods in FIG. 5 and FIG. 6 may be alternatively performed by a terminal. In other words, the execution body, the server, of the foregoing method may be alternatively replaced with the terminal. When the foregoing method is performed by the terminal, the terminal may first obtain the long video and the subtitle file corresponding to the long video from the server, and then the terminal determines the video start time point and the video end time point of each scene from the long video, and performs subsequent steps. A specific execution method is the same as the method steps in FIG. 5 and FIG. 6, and details are not described herein again.

Figure 7A:
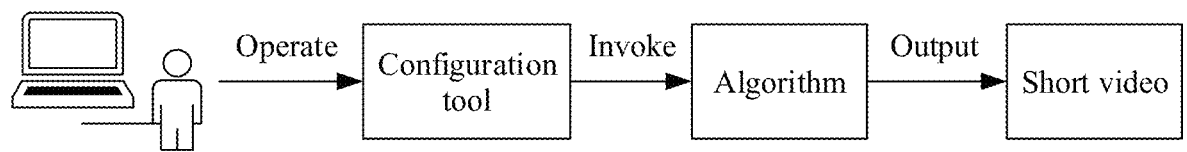
FIG. 7a and FIG. 7b are schematic diagrams of methods according to embodiments of this application.

In an application scenario, as shown in FIG. 7a, based on the foregoing video splitting method, a developer may integrate a computer program (or referred to as an algorithm) corresponding to the video splitting method into a configuration tool on a server side, and the developer or an administrator may perform an operation of importing one or more long videos into the configuration tool. Then, the server invokes the computer program corresponding to the video splitting method, to output a plurality of short videos.

Figure 7B:
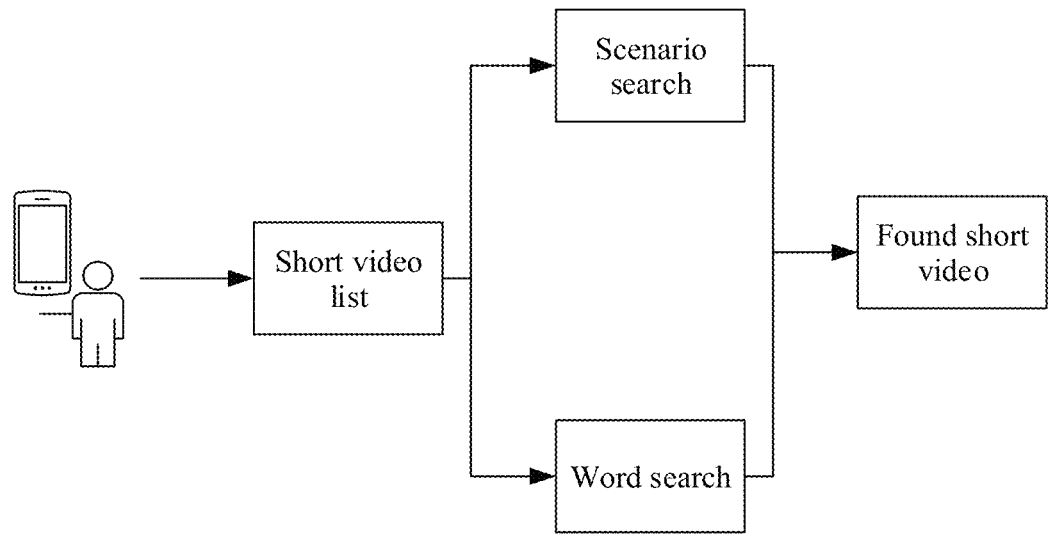

Further, the generated short video may be stored on the server side. When a terminal sends a request to the server, the server sends a corresponding short video to the terminal side. Specifically, as shown in FIG. 7b, when a terminal user operates a video application client on the terminal, the terminal displays an interface including a short video list. It is assumed that when the terminal detects that the user enters a keyword in a search box on the interface or detects that the user taps a scenario label control on the interface, the terminal sends a search request to the server, where the search request includes a subtitle label corresponding to the keyword or a scenario label corresponding to the scenario label control. Because the server side stores an association relationship between a short video identifier and a subtitle label or a scenario label when generating a short video, the server may find a corresponding short video identifier based on the association relationship, and then send a short video corresponding to the short video identifier to the terminal. Further, the terminal displays thumbnail information of the found short video on the interface, and if the terminal detects a playback operation of the user, the terminal chooses to play back the short video.

Figure 7C:
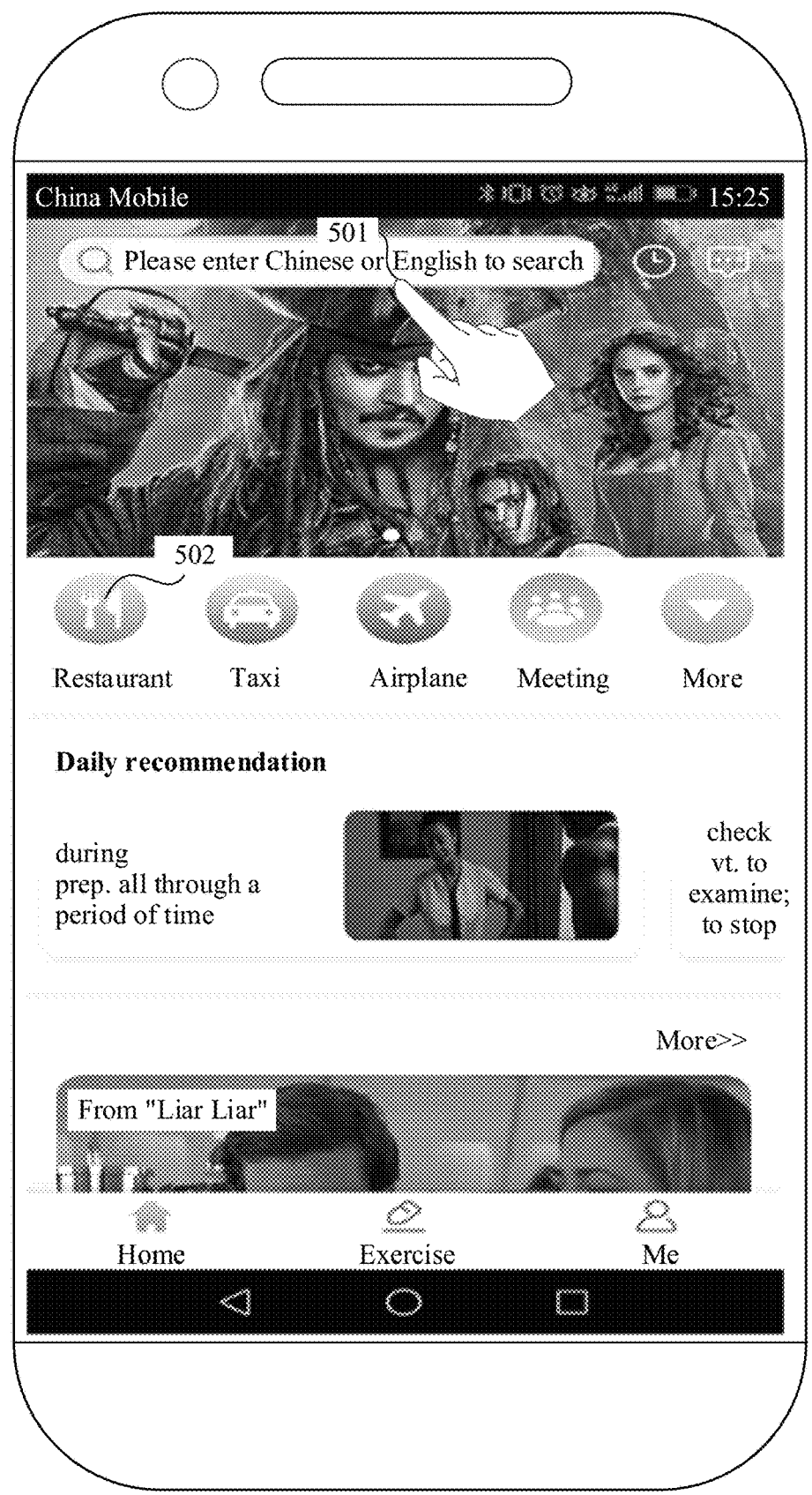
FIG. 7c is a schematic diagram of an application interface according to an embodiment of this application.

For example, when a user logs in to a video application client and enters a video home page, the terminal may display a home page shown in FIG. 7c. The user may enter a word "check" in a search box control 501. When detecting a search instruction of the user, the terminal sends a search request including a subtitle label "check" to the server. Then, the server finds a short video corresponding to the subtitle label "check", and returns information about the short video to the terminal. Then, the terminal displays thumbnail information of the short video corresponding to "check". If the terminal detects a playback operation of the user, the terminal chooses to play back the short video.

For another example, a user may operate a scenario label "restaurant" control 701 on the interface shown in FIG. 7c. When detecting a touch control instruction of the user, the terminal sends a search request including the scenario label "restaurant" to the server. Then, the server finds a short video corresponding to the scenario label "restaurant", and returns information about the short video to the terminal. Then, the terminal displays thumbnail information including the short video. If detecting a playback operation of the user, the terminal chooses to play back the short video. It can be learned that a short video retrieved in such manner more accurately meets a learning requirement of the user.

Figure 8:
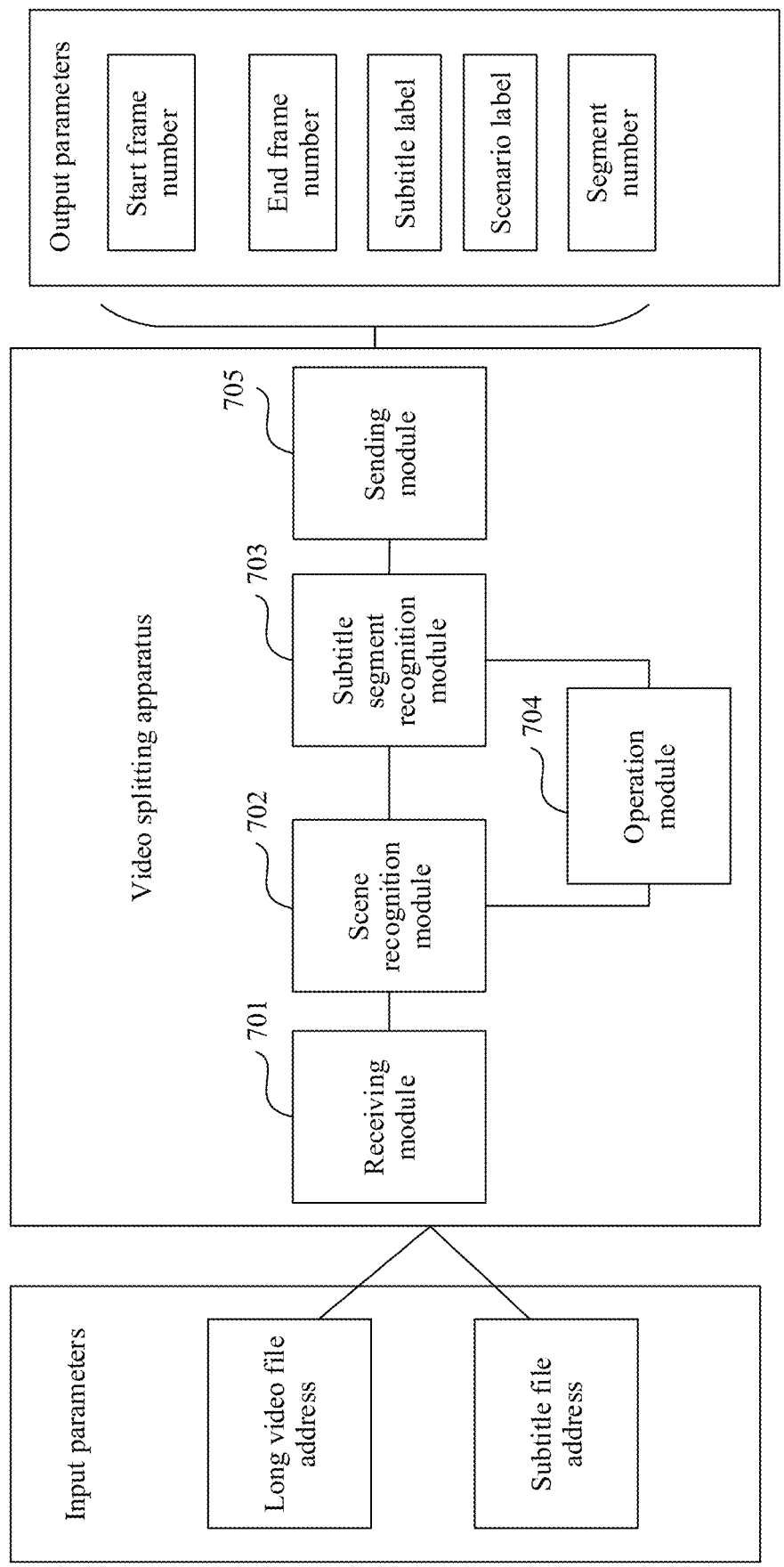
FIG. 8 is a schematic diagram of a video splitting apparatus according to an embodiment of this application.

An embodiment of this application further provides a video splitting apparatus. The video splitting apparatus may be integrated into a server 200, or may be integrated into a terminal 100. As shown in FIG. 8, the apparatus includes a receiving module 701, a scene recognition module 702, a subtitle segment recognition module 703, an operation module 704, and a sending module 705.

If the video splitting apparatus is integrated into the server 200, the receiving module 701 may be configured to receive a long video and a subtitle file that are imported by an administrator or a developer, or an administrator or a developer imports an input parameter that includes a long video file address and a subtitle file address to an interface provided by the receiving module 701, and the receiving module 701 of the video splitting apparatus obtains a corresponding long video and a corresponding subtitle file based on the long video file address and the subtitle file address. For example, the receiving module 701 in FIG. 8 may be implemented by using the transceiver 203 in FIG. 2. If the video splitting apparatus is integrated into the terminal 100, the receiving module 701 may be configured to receive a long video and a subtitle file that are sent by the server. For example, the receiving module 701 in FIG. 8 may be implemented by the mobile communications module 150 or the wireless communications module 160 in FIG. 3. It should be noted that a specific implementation of the units/modules in FIG. 8 in this application.

The scene recognition module 702 is configured to determine a video start time point and a video end time point of each scene from the long video. Specifically, the scene recognition module 702 may be configured to perform step 301 in the embodiment corresponding to FIG. 5. Related content in the method embodiment in FIG. 5 may be cited in function description of the scene recognition module 702, and details are not described herein again. For example, the scene recognition module 702 in FIG. 8 may be implemented by using the processor 201 in FIG. 2, or may be implemented by using the processor 110 in FIG. 3.

The subtitle segment recognition module 703 is configured to determine a subtitle start time point and a subtitle end time point of each subtitle segment from the subtitle file corresponding to the long video. Specifically, the subtitle segment recognition module 703 may be configured to perform step 302 in the embodiment corresponding to FIG. 5. Related content in the method embodiments in FIG. 5 and FIG. 6 may be cited in function description of the subtitle segment recognition module 703, and details are not described herein again. For example, the subtitle segment recognition module 703 in FIG. 8 may be implemented by using the processor 201 in FIG. 2, or may be implemented by using the processor 110 in FIG. 3.

The operation module 704 is configured to: for any scene, determine, based on a video start time point and a video end time point of the scene, at least one subtitle segment corresponding to the scene; then, adjust the video start time point and the video end time point of the scene based on a subtitle start time point and a subtitle end time point of the at least one subtitle segment, to finally obtain an adjusted video start time point and an adjusted video end time point of the scene, and split the long video based on the adjusted video start time point and the adjusted video end time point of each scene, to generate a plurality of short videos. Specifically, the operation module 703 may be configured to perform step 303 to step 305 in the embodiment corresponding to FIG. 5. Related content in the method embodiment in FIG. 5 may be cited in function description of the operation module 704, and details are not described herein again. For example, the operation module 704 in FIG. 8 may be implemented by using the processor 201 in FIG. 2, or may be implemented by using the processor 110 in FIG. 3.

If the video splitting apparatus is integrated into the server 200, the sending module 705 is configured to send a short video to a terminal 100 based on a short video request message of the terminal. For example, the sending module 705 in FIG. 8 may be implemented by using the transceiver 203 in FIG. 2. If the video splitting apparatus is integrated into a terminal 100, the sending module 705 is configured to send a file request message to the server, to request the long video and the subtitle file. For example, the sending module 705 in FIG. 8 may be implemented by using the mobile communications module 150 or the wireless communications module 160 in FIG. 3.

It should be noted that the video splitting apparatus has a function of implementing the terminal or the server in the foregoing method design. These units/modules may be implemented by using hardware in the terminal or the server, or may be implemented by hardware in the terminal or the server by executing corresponding software. This is not limited in this embodiment of this application.

Finally, in addition to generating each short video, the video splitting apparatus further generates an output parameter related to the short video, including a start frame number and an end frame number of the short video, and information such as a subtitle label, a scenario label, and a segment number of the short video. In this way, when receiving a search instruction or a playback instruction of a user, the server or the terminal may determine a corresponding output parameter based on information in the instruction, to find a corresponding short video.

For example, as shown in FIG. 7c, when a user enters a word "check" into a search box, in response to the instruction, the terminal sends a search request to a server corresponding to a video application, where the search request includes information about a subtitle label "check" of a short video. Then, the server finds the corresponding short video based on the subtitle label "check", and sends the short video to the terminal. After receiving the short video, the terminal displays, on an interface, thumbnail information corresponding to the short video. When detecting an instruction of the user for playing back the short video, the terminal plays back the short video.

For another example, when detecting an operation performed by a user on a control "restaurant", the terminal sends a search request to a server corresponding to a video application, where the search request includes information about a scenario label "restaurant" of a short video. Then, the server finds a corresponding short video based on the scenario label "restaurant", and sends the short video to the terminal. After receiving the short video, the terminal displays, on an interface, thumbnail information corresponding to the short video. When detecting an instruction of the user for playing back the short video, the terminal plays back the short video.

To sum up, in this embodiment of this application, on one hand, the video start time point of the short video is determined by using the video start time point of each scene and the subtitle start time point of the subtitle segment corresponding to the scene; on the other hand, the video end time point of the short video is determined by using the video end time point of the scene in the long video and the subtitle end time point of the subtitle segment corresponding to the scene, so that the long video is finally split into a plurality of independent short videos. In addition, a dialog in a short video generated in such manner starts or ends relatively smoothly rather than abruptly, thereby improving user experience. In addition, a user may retrieve, in real time by using label information of a short video, a short video needed by the user, to more accurately meet a learning requirement of the user.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A video splitting method, comprising:
for a scene in a video, determining, based on a video start time point and a video end time point of the scene, a subtitle segment corresponding to the scene, wherein the subtitle segment comprises a dialog;
obtaining an adjusted video start time point and an adjusted video end time point of the scene by
determining, from the subtitle segment, a subtitle start time point closest to the video start time point of the scene, and determining, from the subtitle segment, a subtitle end time point closest to the video end time point of the scene;
selecting a latest time point as an adjusted video start time point of the scene from a later of the video start time point of the scene and the closest subtitle start time point minus a first start offset value; and
selecting an earliest time point as an adjusted video end time point of the scene from the earliest of the video end time point of the scene and a sum of the closest subtitle end time point and a first end offset value; and
splitting the video based on the adjusted video start time point and the adjusted video end time point of the scene, to generate a plurality of short videos.

2. The method according to claim 1, wherein determining the subtitle segment corresponding to the scene comprises:
determining, from the subtitle segment, a first subtitle start time point closest to the video start time point of the scene, and determining, from the subtitle segment, a first subtitle end time point closest to the video end time point of the scene, and
determining a subtitle segment falling between the first subtitle start time point and the first subtitle end time point, a first adjacent subtitle segment preceding a subtitle segment in which the first subtitle start time point is located, and a second adjacent subtitle segment following a subtitle segment in which the first subtitle end time point is located as subtitle segments corresponding to the scene.

3. The method according to claim 2, wherein adjusting the video start time point and the video end time point of the scene to obtain the adjusted video start time point and an adjusted video end time point of the scene comprises:
selecting a latest time point as the adjusted video start time point of the scene from a later of the video start time point of the scene, a subtitle end time point of the first adjacent subtitle segment, and the first subtitle start time point minus a second start offset value; and
selecting an earliest time point as the adjusted video end time point of the scene from the earliest of a subtitle end time point of the second adjacent subtitle segment, the video end time point of the scene, and a sum of a subtitle end time point of the first subtitle segment and a second end offset value.

4. The method according to claim 1, further comprising:
splitting a subtitle file corresponding to a long video into subtitle segments, based on a start time point and an end time point of each dialog of a plurality of dialogs in the subtitle file; and
determining the subtitle start time point and the subtitle end time point of each subtitle segment of the subtitle segments, wherein the subtitle segment is one of the subtitle segments.

5. The method according to claim 4, wherein determining the subtitle start time point and the subtitle end time point of each subtitle segment comprises:
obtaining the dialog start time point and the dialog end time point of each dialog, and using a dialog start time point of a first dialog of the plurality of dialogs as a subtitle start time point of a first subtitle segment, and
calculating a segmentation time point by shifting the dialog start time point of the first dialog backward by a fixed duration, and determining that a dialog end time point of the first dialog is a subtitle end time point of the first subtitle segment; and
sequentially using a next dialog of the plurality of dialogs following a subtitle end time point of a previous subtitle segment as a current dialog, and performing the following operations on the current dialog:
calculating a segmentation time point by shifting a dialog start time point of the current dialog backward by the fixed duration; and
if the segmentation time point falls within a dialog of the plurality of dialogs, determining that a dialog end time point of the current dialog is a subtitle end time point of a current subtitle segment, or
if the segmentation time point does not fall within any dialog of the plurality of dialogs, selecting a dialog end time point of an adjacent dialog preceding the segmentation time point as the subtitle end time point of the current subtitle segment.

6. The method according to claim 1, wherein after the electronic device generates the plurality of short videos, the method further comprises:

for any short video, of the plurality of short videos, determining a subtitle segment corresponding to that short video, based on a video start time point and a video end time point of the short video;

determining that a proportion of a total duration of the subtitle segment to a total duration of the short video is greater than a threshold; and storing the short video.

7. The method according to claim 1, wherein after the electronic device generates the plurality of short videos, the method further comprises:

for any short video of the plurality of short videos:

dividing sequential frames of images in that short video into two parts, extracting N frames of images from each of the two parts to perform scenario recognition, performing selection on scenario recognition results of the N frames of images in each part, and using a scenario recognition result, appearing most frequently, as label information of that part, wherein N is a positive integer greater than or equal to 1; and performing selection on the label information of the two parts, and using label information, appearing most frequently, as label information of the short video.

8. A non-transitory computer storage medium comprising a computer program, and when the computer program is run on an electronic device, the electronic device is enabled to perform a video splitting method comprising:

for a scene in a video, determining, based on a video start time point and a video end time point of the scene, a subtitle segment corresponding to the scene, wherein the subtitle segment comprises a dialog;

obtaining an adjusted video start time point and an adjusted video end time point of the scene by determining, from the subtitle segment, a subtitle start time point closest to the video start time point of the scene, and determining, from the subtitle segment, a subtitle end time point closest to the video end time point of the scene;

selecting a latest time point as an adjusted video start time point of the scene from a later of the video start time point of the scene and the closest subtitle start time point minus a first start offset value; and selecting an earliest time point as an adjusted video end time point of the scene from the earliest of the video end time point of the scene and a sum of the closest subtitle end time point and a first end offset value; and splitting the video based on the adjusted video start time point and the adjusted video end time point of the scene, to generate a plurality of short videos.

9. The computer storage medium according to claim 8, wherein determining the subtitle segment corresponding to the scene comprises:

determining, from the subtitle segment, a first subtitle start time point closest to the video start time point of the scene, and determining, from the subtitle segment, a first subtitle end time point closest to the video end time point of the scene; and determining a subtitle segment falling between the first subtitle start time point and the first subtitle end time point, a first adjacent subtitle segment preceding a subtitle segment in which the first subtitle start time point is located, and a second adjacent subtitle segment following a subtitle segment in which the first subtitle end time point is located as subtitle segments corresponding to the scene.

10. The computer storage medium according to claim 9, wherein adjusting the video start time point and the video end time point of the scene to obtain the adjusted video start time point and an adjusted video end time point of the scene comprises:

selecting a latest time point as the adjusted video start time point of the scene from a later of the video start time point of the scene, a subtitle end time point of the first adjacent subtitle segment, and the first subtitle start time point minus a second start offset value; and selecting an earliest time point as the adjusted video end time point of the scene from an earliest of a subtitle end time point of the second adjacent subtitle segment, the video end time point of the scene, and a sum of a subtitle end time point of the first subtitle segment and a second end offset value.

11. The computer storage medium according to claim 8, wherein the video splitting method further comprises:

splitting a subtitle file corresponding to a long video into subtitle segments, based on a start time point and an end time point of each dialog of a plurality of dialogs in the subtitle file; and determining the subtitle start time point and the subtitle end time point of each subtitle segment of the subtitle segments, wherein the subtitle segment is one of the subtitle segments.

12. The computer storage medium according to claim 11, wherein determining the subtitle start time point and the subtitle end time point of each subtitle segment comprises:

obtaining the dialog start time point and the dialog end time point of each dialog, and using a dialog start time point of a first dialog as a subtitle start time point of a first subtitle segment, and calculating a segmentation time point by shifting the dialog start time point of the first dialog backward by a fixed duration, and determining that a dialog end time point of the first dialog is a subtitle end time point of the first subtitle segment; and sequentially using a first dialog following a subtitle end time point of a previous subtitle segment as a current dialog, and performing the following operations on the current dialog:

calculating a segmentation time point by shifting a dialog start time point of the current dialog backward by the fixed duration; and if the segmentation time point falls within a dialog of the plurality of dialogs, determining that a dialog end time point of the dialog is a subtitle end time point of the current subtitle segment, or if the segmentation time point does not fall within any dialog of the plurality of dialogs, selecting a dialog end time point of an adjacent dialog preceding the segmentation time point as the subtitle end time point of the current subtitle segment.

13. The computer storage medium according to claim 8, wherein after the electronic device generates the plurality of short videos, the method further comprises:

for any short video, of the plurality of short videos, determining a subtitle segment corresponding to that short video, based on a video start time point and a video end time point of the short video;

determining that a proportion of a total duration of the subtitle segment to a total duration of the short video is greater than a threshold; and storing the short video.

14. The computer storage medium according to claim 8, wherein after the electronic device generates the plurality of short videos, the method further comprises:

for any short video of the plurality of short videos:
dividing sequential frames of images in that short video into two parts, extracting N frames of images from each of the two parts to perform scenario recognition, performing selection on scenario recognition results of the N frames of images in each part, and using a scenario recognition result, appearing most frequently, as label information of that part, wherein N is a positive integer greater than or equal to 1; and
performing selection on the label information of the two parts, and using label information, appearing most frequently, as label information of the short video.

15. An electronic device comprising:
one or more processors; and
a memory configured to store one or more computer programs that, when executed by the one or more processors, cause the electronic device to:
for a scene in a video, determine, based on a video start time point and a video end time point of the scene, a subtitle segment corresponding to the scene, wherein the subtitle segment comprises a dialog;
obtain an adjusted video start time point and an adjusted video end time point of the scene by
determining, from the subtitle segment, a subtitle start time point closest to the video start time point of the scene, and determining, from the subtitle segment, a subtitle end time point closest to the video end time point of the scene,
selecting a latest time point as an adjusted video start time point of the scene from a later of the video start time point of the scene and the closest subtitle start time point minus a first start offset value, and
selecting an earliest time point as an adjusted video end time point of the scene from the earliest of the video end time point of the scene and a sum of the closest subtitle end time point and a first end offset value; and
split the video based on the adjusted video start time point and the adjusted video end time point of the scene, to generate a plurality of short videos.

16. The electronic device according to claim 15, wherein determining the subtitle segment corresponding to the scene comprises:
determining, from the subtitle segment, a first subtitle start time point closest to the video start time point of the scene, and determining, from the subtitle segment, a first subtitle end time point closest to the video end time point of the scene, and
determining a subtitle segment falling between the first subtitle start time point and the first subtitle end time point, a first adjacent subtitle segment preceding a subtitle segment in which the first subtitle start time point is located, and a second adjacent subtitle segment following a subtitle segment in which the first subtitle end time point is located as subtitle segments corresponding to the scene.

17. The electronic device according to claim 16, wherein adjusting the video start time point and the video end time point of the scene to obtain the adjusted video start time point and an adjusted video end time point of the scene comprises:

selecting a latest time point as the adjusted video start time point of the scene from a later of the video start time point of the scene, a subtitle end time point of the first adjacent subtitle segment, and the first subtitle start time point minus a second start offset value; and
selecting an earliest time point as the adjusted video end time point of the scene from the earliest of a subtitle end time point of the second adjacent subtitle segment, the video end time point of the scene, and a sum of a subtitle end time point of the first subtitle segment and a second end offset value.

18. The electronic device according to claim 15, wherein when executed by the one or more processors, the one or more computer programs further cause the electronic device to:
split a subtitle file corresponding to a long video into subtitle segments, based on a start time point and an end time point of each dialog of a plurality of dialogs in the subtitle file; and
determine the subtitle start time point and the subtitle end time point of each subtitle segment of the subtitle segments, wherein the subtitle segment is one of the subtitle segments.

19. The electronic device according to claim 15, wherein determining the subtitle start time point and the subtitle end time point of each subtitle segment comprises:
obtaining the dialog start time point and the dialog end time point of each dialog, and using a dialog start time point of a first dialog of the plurality of dialogs as a subtitle start time point of a first subtitle segment, and
calculating a segmentation time point by shifting the dialog start time point of the first dialog backward by a fixed duration, and determining that a dialog end time point of the first dialog is a subtitle end time point of the first subtitle segment; and
sequentially using a next dialog of the plurality of dialogs following a subtitle end time point of a previous subtitle segment as a current dialog, and performing the following operations on the current dialog:
calculating a segmentation time point by shifting a dialog start time point of the current dialog backward by the fixed duration; and
if the segmentation time point falls within a dialog of the plurality of dialogs, determining that a dialog end time point of the current dialog is a subtitle end time point of a current subtitle segment, or
if the segmentation time point does not fall within any dialog of the plurality of dialogs, selecting a dialog end time point of an adjacent dialog preceding the segmentation time point as the subtitle end time point of the current subtitle segment.

20. The electronic device according to claim 15, wherein when executed by the one or more processors, the one or more computer programs further cause, after the electronic device generates the plurality of short videos, the electronic device to:
for any short video, of the plurality of short videos, determine a subtitle segment corresponding to that short video, based on a video start time point and a video end time point of the short video;
determine that a proportion of a total duration of the subtitle segment to a total duration of the short video is greater than a threshold; and
store the short video.

* * * * *